United States Patent Office 2,786,824
Patented Mar. 26, 1957

2,786,824

CATIONIC UREA-FORMALDEHYDE RESINS AND PREPARATION THEREOF

Gerald I. Keim, Oxford, Pa., assignor to Hercules Powder Company, Wilmington, Del., a corporation of Delaware No Drawing. Application August 21, 1953,
Serial No. 375,827

11 Claims. (Cl. 260—70)

This invention relates in general to a cationic urea-formaldehyde resin and a process for producing the resin.

An ever important problem in the manufacture of paper has been the preparation of a wet strength paper whereby the paper is resistant to tearing or breaking even when wet. This property of increased strength and particularly wet strength has been imparted to the paper through the incorporation in a paper furnish of a urea-formaldehyde resin, but previously the incorporation of such a resin in the paper furnish has been accomplished by precipitating the resin or by utilizing a resin which has been partly polymerized and which is characterized by being in the gel state or nearly in the gel state with the result that the urea-formaldehyde resin is mechanically entrained on the paper fibers.

More recently, high wet strength and dry strength paper products have been prepared by the addition thereto of a partially polymerized hydrophilic cationic urea-formaldehyde resin which contains as a modifier a water-soluble polyfunctional organic nitrogen base. A description of these resins is contained in U. S. Patent No. 2,554,475 to Tzeng-Jiueq Suen et al.; Canadian Patent No. 467,505 to John H. Daniel, Jr. et al.; in my Canadian Patent No. 468,512; and in my copending application Serial No. 341,889 filed March 12, 1953. These modified resins are substantive to the paper fibers, i. e., they are characterized by substantial exhaustion onto the paper fibers and even distribution thereon without the need of addition of a precipitating or fixing agent. The use of such resins leads to a process for preparing a paper of extraordinarily high wet strength by a practicable process easily adaptable to existing paper machinery.

In making cationic modified urea-formaldehyde resins, thiourea or a mixture of urea and thiourea may be used in place of urea, while any methylene-yielding substance such as para-formaldehyde or hexamethylenetetramine, may be substituted for formaldehyde. The ratio of methylene-yielding substance to urea, thiourea, or mixture thereof is not critical. When formaldehyde is used, the preferred ratio is from 1.8 to 2.8 moles of formaldehyde per mole of urea, thiourea, or mixture thereof. Hereafter the invention will be discussed in terms of urea and formaldehyde as the primary reactants but it is understood that any methylene-producing substance, as stated above, may be used in place of formaldehyde and that either thiourea or mixtures of thiourea with urea may be used in place of urea.

The water-soluble polyfunctional organic nitrogen bases used to modify the urea-formaldehyde resins are alkylenepolyamines of the formula $H_2N(C_nH_{2n}HN)_xH$ in which $n$ is two or more and $x$ is one or more, such as ethylenediamine and 1,3-propylenediamine and polyalkylenepolyamines such as diethylenetriamine, triethylenetetramine, tetraethylenepentamine; the corresponding polypropylene-polyamines and polybutylenepolyamines; also guanidines, biguanides, the guanylureas and the salts thereof; condensation products of alkylenepolyamines, such as the above with halohydrins such as α-dichlorhydrin, epichlorhydrin and the like; monoalkylolamines; dialkylolamines, trialkylolamines, and the like; and the water-soluble condensation products thereof with aldehydes such as formaldehyde. The amount of water-soluble polyfunctional organic nitrogen base used may vary widely. Generally, from about 3% to about 44% of the polyfunctional base by weight based on the urea is preferred. The polyalkylenepolyamines are the preferred polyfunctional bases for the purpose of this invention.

It is preferred to heat all the ingredients together for a short period of time under alkaline conditions and then for a relatively long period of time under acid conditions until a resin sirup of the desired viscosity is formed. If desired, the alkaline reaction can be omitted and the entire reaction carried out under acid conditions. An alternative procedure for making the resins involves reacting urea and formaldehyde under alkaline conditions followed by addition of the water-soluble polyfunctional organic nitrogen base and reaction under acid conditions until a resin having the desired viscosity is achieved. In general, as set forth in the art, cationic modified urea-formaldehyde resins suitable for use as wet strength resins should have a viscosity of at least about D on the Gardner-Holdt scale when measured at 20° C. on an aqueous solution having 45% solids by weight.

These resins, while representing a great advance over the prior art in flexibility of use on the paper machine and in the quality of the product produced, nevertheless suffer a very serious drawback in that all are characterized by the fact that not more than about 50% of the resin is retained by the paper when the resin is added to the water suspension of paper stock, i. e., at any point of the papermaking machine ahead of the wire or screen. This is clearly shown by Fig. 1 of Canadian 467,505. As this is virtually the sole method used commercially to incorporate these resins in paper, this is a serious drawback. Recirculating the white water has not proved a satisfactory answer. Thus, it is necessary to run part of the white water to the sewer in order to prevent the accumulation of dissolved substances in the paper mill systems. These substances, if allowed to accumulate indefinitely, tend to cause trouble with foaming, slime growth, poor sizing and sticking on the press rolls. In addition, it has been found that recirculation of the white water does not result in any saving of urea-formaldehyde resin as would be expected from the amounts of resin present in the white water.

Now in accordance with the present invention there has been discovered a cationic modified urea-formaldehyde resin which is substantially completely retained by the paper when added to a water suspension of paper fiber and a process for producing this resin. It is possible by using the resins of the instant invention to obtain the same wet strength as obtained with the prior art cationic urea-formaldehyde resins with the use of only about one-half the amount of the instant resins as was necessary with prior art resins. Conversely, it is possible to obtain approximately a 30% increase in wet strength by using the same amount of the instant resin to treat paper as of the prior art resin.

These highly efficient cationic urea-formaldehyde resins are prepared by treating an aqueous solution of a cationic urea-formaldehyde resin modified by a water-soluble polyfunctional organic nitrogen base, which resin has been produced by any of the methods set forth above, with an appropriate basic material, namely, an organic base, an inorganic base or a basic salt in such amount as to provide a pH of about 8.5 or greater in the aqueous solution. The maximum pH is that which would cause gelation of the resin. It is generally preferred to use a pH of from about 9 to about 10. As a result of this treatment, a fraction of the original resin is precipitated.

This precipitate may be separated by any of the processes known to those skilled in the art, such as filtering, centrifuging or allowing the precipitate to settle and then either decanting the supernatant liquid or draining off the lower layer. The resin so separated has been found to be substantially completely retained on the paper fibers when used in the so-called beater addition process. The yield of precipitate may be varied from about 20% to about 60% of the starting resin solids by varying the temperature, the base, the pH of the aqueous solution, and the dilution and nature of the starting cationic resin.

The filtrate which contains the unprecipitated resin may be treated to produce further amounts of cationic urea-formaldehyde resin which may then be treated in accordance with this invention. Thus, the filtrate may be concentrated to about 40% to about 50% solids with about 43% to about 45% solids preferred, and the ratio of urea to formaldehyde adjusted to the desired value. This solution may then be polymerized in a manner similar to that used in preparing the original resin either with or without adding a fresh charge of urea, formaldehyde, and water-soluble polyfunctional organic nitrogen base modifier to the concentrated filtrate.

An alternative method of recovering the resin values in the filtrate, while avoiding the evaporation of water, is to add to the filtrate a concentrated form of formaldehyde, such as paraformaldehyde, dimethylolurea or a concentrated solution of formaldehyde which has been stabilized with urea (such a solution is marketed by the E. I du Pont de Nemours & Company under the trade name of "Arboneeld B"). Sufficient urea is added along with the formaldehyde to maintain the desired urea to formaldehyde ratio. By this means the solution is adjusted to about 40% to about 50% solids, with from about 43% to about 45% solids preferred. Additional amounts of the water-soluble polyfunctional organic nitrogen base modifier are added and the solution is polymerized in a manner similar to that used in preparing the original resin.

It has been found that the resins obtained by reworking the unprecipitated fractions produced in the process of the instant invention give approximately the same proportion of precipitated resin when processed in the instant process as do those resins which do not contain any reworked fractions. Thus, substantially none of the cationic modified urea-formaldehyde resin is lost either in producing the more highly efficient resins of the instant invention or in the papermaking process wherein the resin is used to produce a paper of exceptionally high wet strength.

The nature of the resin produced by the process of the instant invention is not fully known. However, it is known that the resin has the highly unusual property of being substantially completely retained by the paper fibers when added to the beater in the papermaking process.

The general nature and form of the invention having been set forth and described the following examples are presented in illustration but not in limitation of the invention. All parts and percentages are by weight unless otherwise specified. Where no temperature is specified, room temperature was used.

*Example 1*

A solution was prepared containing 864 parts of urea with 2,608 parts of 37% formaldehyde which was methanol-free. To this was added 116.8 parts of triethylenetetramine. The solution was refluxed for 5 minutes, and then 80 parts of 90% formic acid were added. The solution was again heated to reflux (about 102° C.) and maintained at this temperature until the viscosity, as determined on a 44% aqueous solution, had risen to U–V on the Gardner-Holdt scale. The solution was then cooled, neutralized with sodium hydroxide to stop further polymerization and diluted to give a 30% solids solution.

Two hundred seventy-five parts of the 30% solution were further diluted with water to give 500 parts of solution. This solution was adjusted to a pH of 9.5 with a 10% sodium hydroxide. A heavy curdy precipitate settled out and formed a sticky viscous lower layer. The upper layer was decanted and the lower layer (91.0 parts) dissolved in 300 parts of water which had been adjusted to a pH of 4.0 with formic acid. The resulting solution contained 7.1% solids.

The solution of the precipitated resin was evaluated in a bleached sulfite pulp against a portion of the original resin solution as control. The pulp was beaten to a Schopper-Riegler freeness of 750 cc. and then treated with alum to obtain a pH of 4.5. The resin was then added and the pulp formed into handsheets having a basis weight of 40 lb./ream on a Noble and Wood handsheet machine. The sheets were cured for one hour at 105° C. Test strips were then cut, soaked in distilled water for 24 hours and then tested for their tensile strength while wet. The results are set forth in the following table. In the table, A stands for the control, i. e., the untreated 30% resin solution produced above, while B represents the precipitated resin solution. The percent of resin is based on the dry weight of the pulp.

| Test No. | Type of Resin | Percent Resin Added | Wet Tensile Strength (lb./sq. in.) |
|---|---|---|---|
| 1 | A | 0.5 | 4.2 |
| 2 | B | 0.5 | 5.5 |
| 3 | A | 1.0 | 6.0 |
| 4 | B | 1.0 | 7.8 |
| 5 | A | 2.0 | 7.8 |
| 6 | B | 2.0 | 10.0 |
| 7 | A | 3.0 | 8.5 |
| 8 | B | 3.0 | 10.9 |

*Example 2*

One hundred fifty parts of the resin solution produced in Example 1 were adjusted to a pH of 10.5 with 25% sodium hydroxide. To this mixture was added 50 parts of water and the solution stirred and cooled to 10° C. After standing for 30 minutes, the supernatant liquid was decanted, leaving a viscous precipitate. This was stirred with 500 parts of methanol, and the resulting mass filtered. The precipitate was removed from the filter and dried under vacuum. There was obtained a dry product constituting 14.5 parts by weight and representing a yield of 32% of the original resin solids. A 2% solution of the dry resin was prepared by dissolving the resin in water containing 0.03% of 90% formic acid. This solution was twice as efficient as the untreated resin used as the control when used as a wet strength beater additive for sulfite pulp as set forth in Example 1.

*Example 3*

One hundred parts of the 30% resin solution produced in Example 1 were adjusted to a pH of 9.5 with a slurry of CaO. To this was added 200 parts of water. A precipitate immediately formed and settled out. The supernatant liquid was decanted. The lower layer constituted 37 parts having about 30% solids content. When a 2% solution of the precipitated resin in dilute formic acid was evaluated as a wet strength beater additive for bleached sulfite pulp, as set forth in Example 1, the precipitated resin was twice as efficient as the untreated resin.

*Example 4*

One hundred parts of the 30% resin solution produced in Example 1 were diluted with 100 parts of water. To this was then added 17.1 parts of triethylenetetramine which raised the pH of the solution to 10.1. A precipitate formed and settled out. The supernatant liquid was decanted and the lower layer vigorously stirred with two 400-part portions of methanol. The precipitate was filtered and dried in vacuo to give 12.6 parts of a dry product representing a 42% yield, based on the original resin solids. A solution was prepared from the dry powder as set forth in Example 2. This solution was twice as efficient as the untreated resin sirup when used as a wet strength beater additive for bleached sulfite pulp as set forth in Example 1.

*Example 5*

Example 4 was duplicated substituting 23 parts of concentrated ammonium hydroxide for the triethylenetetramine. The pH of the solution during precipitation was 10.8. There were obtained 12.5 parts of dried product. When a solution of the product was tested as a wet strength resin in a bleached sulfite pulp, as set forth in Example 1, the precipitated resin was found to be twice as efficient as the untreated resin.

The quantity of highly efficient cationic modified urea-formaldehyde resin obtained in accordance with the instant invention may be increased by (1) diluting the resin solution to a lower solids content; (2) cooling the resin solution; or (3) to some extent, by increasing the amount of base used. The amount of basic material used is not critical as can be seen from the examples set forth above, so long as it is sufficient to give a pH of about 8.5. The maximum pH is that which would cause gelation of the resin. It is generally preferred to use a pH of from about 9 to about 10. The optimum concentration of resin and base will, in any instance, be varied to suit commercial convenience.

The temperature may vary anywhere from the freezing point of the aqueous resin solution to about 80° C. For commercial convenience, it is generally preferred to use a temperature between about 5° C. and room temperature, i. e., up to about 35° C.

The concentration of the resin solution which is to be fractionated likewise may vary widely. In general, any concentration between that at which the resin is produced (about 45% solids, by weight) and the maximum amount of water which it would be economical to handle may be used for most of the resins. For the polyalkylenepolyamine-modified urea-formaldehyde resins, however, it is preferred to use from about 30% to about 1% solids, by weight.

The highly efficient wet strength resins of the present invention may be used as such to prepare paper of high wet strength or they may be blended with any of the prior art cationic wet strength resins to produce a product of improved efficiency. The precipitated resins may be dried as in Example 2 and 4 or they may be converted to a solution by acidifying to a pH of no more than about 7-8 with an acid such as formic acid and adding additional water. To assure a reasonable shelf-life it is preferred that the solution have a solids content of not greater than about 30% by weight. When the resin is to be used immediately, a higher solids content may, of course, be used.

Any organic base, inorganic base or basic salt which will provide a pH of about 8.5 or greater in the aqueous solution may be used. However, for purposes of economy and ease of commercial availability, caustic soda, soda ash and lime are particularly preferred. Those organic bases which are also modifiers for the urea-formaldehyde resins, such as triethylenetetramine, are also preferred as their use eliminates the necessity of adding further amounts of such modifiers to the filtrate when reworking the filtrate to recover usable cationic urea-formaldehyde resin therefrom.

I claim:

1. A process for treating a hydrophilic cationic urea-formaldehyde-polyfunctional organic nitrogen base resin to form a resin of improved properties in producing wet strength paper which consists in forming an aqueous solution of such a urea-formaldehyde resin in which the amount of polyfunctional organic nitrogen base is from about 3% to about 44% of the weight of the urea, said resin containing a fraction precipitatable therefrom in said aqueous solution by the addition thereto of a basic material sufficient to give the solution a pH of from at least about 8.5 up to but not including that pH which would cause gelation of the resin, adding to the solution a basic material sufficient to give a pH within the indicated range and thereby cause said fraction to precipitate, and separating the resulting precipitate.

2. A process according to claim 1 wherein the basic material is calcium oxide.

3. The process according to claim 1 wherein the basic material is triethylenetetramine.

4. The process according to claim 1 wherein the polyfunctional organic nitrogen base is an alkylenepolyamine.

5. The process according to claim 4 wherein the alkylenepolyamine is ethylenediamine.

6. The process according to claim 1 wherein the polyfunctional organic nitrogen base is a polyalkylenepolyamine.

7. The process according to claim 6 wherein the polyalkylenepolyamine is diethylenetriamine.

8. The process according to claim 6 wherein the polyalkylenepolyamine is triethylenetetramine.

9. The process according to claim 6 wherein the polyalkylenepolyamine is tetraethylenepentamine.

10. The process according to claim 8 wherein the basic material is calcium oxide.

11. The process according to claim 8 wherein the basic material is triethylenetetramine.

References Cited in the file of this patent

UNITED STATES PATENTS

| | | |
|---|---|---|
| 1,951,994 | Rochet | Mar. 20, 1934 |
| 2,161,805 | Dreyfus | June 13, 1939 |
| 2,200,164 | Durant | May 7, 1940 |
| 2,642,360 | Mackinney et al. | June 16, 1953 |
| 2,657,132 | Daniel et al. | Oct. 27, 1953 |